March 21, 1961 F. W. SCHOELLHAMMER 2,975,720
GEAR UNIT OR OTHER MOVABLE MECHANISM
Filed July 11, 1955 3 Sheets-Sheet 3

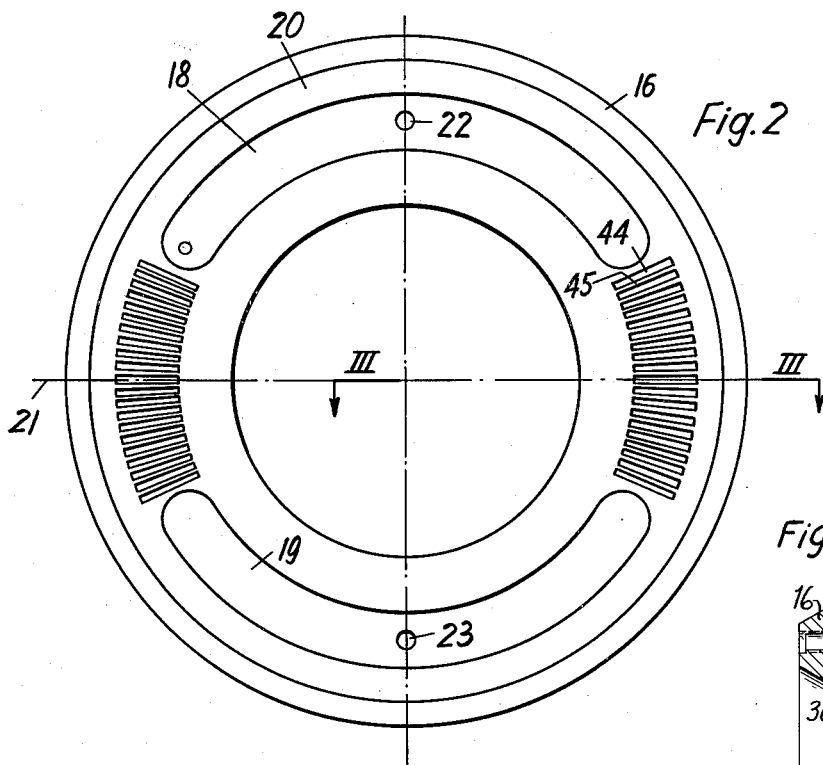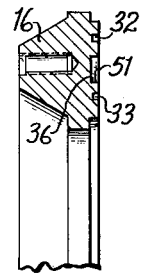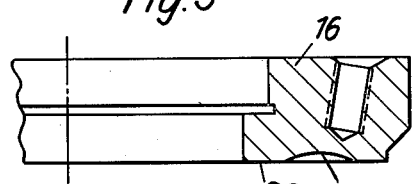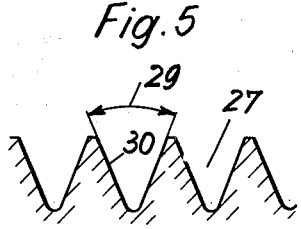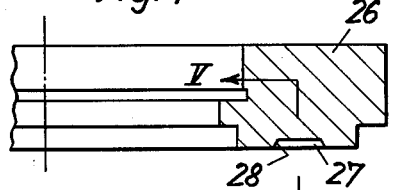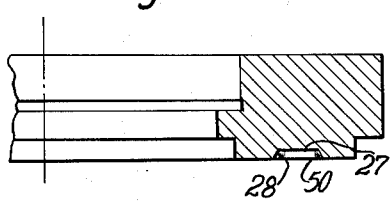

INVENTOR
FRIEDRICH W. SCHOELLHAMMER.

BY *Dicke and Craig*
ATTORNEYS.

United States Patent Office

2,975,720
Patented Mar. 21, 1961

2,975,720

GEAR UNIT OR OTHER MOVABLE MECHANISM

Friedrich Wilhelm Schoellhammer, Stuttgart-Bad Cannstatt, Germany, assignor to Daimler-Benz Aktiengesellschaft, Stuttgart-Unterturkheim, Germany Filed July 11, 1955, Ser. No. 521,343

Claims priority, application Germany Mar. 9, 1955

17 Claims. (Cl. 103—162)

The present invention relates to a thrust bearing for transmissions or drive mechanisms in which two surfaces are in moving engagement under load. More particularly, the present invention relates to the construction of drives for hydrostatic transmissions or similarly acting pumps, preferably axial piston-type pumps having pistons with parallel axes, the cylinders of which are supported by plate or thrust bearings disposed perpendicularly to the axes of the pistons and which, at the same time, serve as control means for the inlet and discharge of the hydraulic medium.

The control apertures for feeding the hydrostatic medium, particularly oil, of hydrostatic transmissions which consist of an oil pump and an oil motor are generally provided within the end walls of the cylinder, and such end wall usually serves at the same time as a supporting surface which rotates on the control member. The hydrostatic medium which is controlled by the supporting or contact surfaces is usually maintained under high pressure, and the compression pressure of the individual pistons then acts eccentrically or unilaterally upon the cylinder or piston drum. This results in edge pressures which cause extreme wear and scoring of the control surfaces or the compensating thrust bearings, particularly if high operating pressures are involved. However, because of a very high specific load, the aforementioned characteristics occur also in the bearings of the transmission which are not actually acted upon unilaterally, as well as when feeding the oil to the guiding surfaces through grooves and apertures. Furthermore, at high pressures exceeding, for example, 75 atm., the guide surfaces are heated to very high temperatures which subject these surfaces to excessive wear. The consequences of this are leakage losses, a low efficiency, and a reduction of the working life of the transmission.

If, for example, two control grooves are disposed opposite to each other on a common circle of a control surface which cooperates with an opposed surface which is provided with controlled connecting apertures, the segments of such circle located between the two control grooves are subjected during the operation to an increased lubrication by the operating fluid, particularly oil, which is controlled by the control grooves. Because of such increased lubrication of these points, manifestations of wear will appear during the continued operation, at first only on some other less lubricated parts of the control surface until the aforementioned circular segments, because of the resulting enlargement of the surface and the corresponding increase in the oil flow at the other parts of the control surface, will be increasingly used for supporting purposes so that these circular segments will finally be very poorly lubricated. Consequently, the control surfaces will be increasingly worn at these segments which, in turn, causes an increased wear upon the other parts of the control surfaces, etc. Apart from the fact that the control surfaces will thus be worn off relatively soon, it has also been found that particularly the circular segments between the two control grooves will become very hot during the time when they have to carry an increased load, and that they will strongly tend to score with the final result that the entire control-surface member will be ruined.

It is consequently an object of the present invention to reduce the friction and wear upon such strongly affected surfaces, to increase the loading or carrying capacity of the transmission parts which are in movable engagement with each other, and particularly of the control surfaces of a hydraulic transmission, and to increase the useful life thereof.

An important feature of the present invention thus consists in making at least one of the contact or bearing surfaces which are sliding along each other of a material which is particularly adapted to reduce the friction or to increase the lubricating action, and which possesses suitable self-lubricating qualities.

According to the present invention, such material preferably consists of a sinter material, and especially one containing oil, or a material of similar structure. The sinter material or the material having a sinterlike structure which preferably consists of pulverized nonferrous metals, or in suitable cases of ceramic materials, and is preferably made under a high pressure and/or a high temperature, may be sintered, sprayed or otherwise applied upon a solid base. The sinter material to be used preferably consists of bronze or aluminum or their alloys, or babbit metals. Such material may contain additions of lead, graphite, sulphides, phosphates, or the like, while such substances which counteract the lubricating qualities, such as iron or the like, are preferably withheld or abstracted therefrom.

The thickness of the layer of sintering material or sinterlike material which is to be applied upon the basic material is preferably made of such a size that the elastic qualities of the basic material will be maintained. The void ratio of the material of the bearing or contact surface may amount from 3 to 95%, and preferably between 5 and 50%, depending upon the particular use, since the voids or pores are adapted to take up relatively large amounts of lubricants, such as oil or the like.

The use of porous materials, and particularly of a sinter material on the bearing surfaces results in a series of advantages over the use of solid materials. Whenever the pressure oil acts upon the contact surfaces or control surfaces, it will be forced into the pores of the material so that independently of the load there will always be a reserve of lubricant in and on the surfaces. The additions to the sintering material usually have self-lubricating qualities. Thus, when tuning up the contact surfaces, they will possess their own lubrication. At any prevailing load, the bearing temperatures may be held within such low limits that the transmission may be operated continuously without damage to the contact or control surfaces thereof.

The contact surfaces may be made plain, spherical, or of any other shape, even cylindrical. However, the present invention is principally concerned with axially loaded, plain or spherical surfaces.

A further object of the present invention consists in providing a basic material for making the essential parts of the transmissions with grooves or recesses which are adapted to receive a relatively soft material, and particularly a sinter material, and in the particular design and arrangement of such grooves or recesses. More particularly it is an object of the invention to provide the control apertures or control channels which intersperse the contact surface of hydrostatic transmissions with a softer material which is embedded therein in a very particular and advantageous manner which is designed to improve the lubricating effect, to reduce the wear, and to prevent the softer material from breaking off or crumbling away, for example, from the control edges of the contact surface.

Another feature of the invention therefore consists in the provision of control channels and the material which is adapted to improve the lubricating qualities in an alternate succession in the direction of rotation of the contact surface. The control apertures in the contact surfaces may then be surrounded by a portion or web of harder material so that the softer material adjoins the webs around the control apertures. The softer lubricating material may also be disposed in grooves or chambers which extend transversely to the relative direction of movement of the two contact surfaces and are separated from each other by relatively narrow portions of harder material.

By such an arrangement of the chambers the lubricating material will be held back from the points of less wear so as to serve for attaining a supplementary cooling action of the surfaces which have to be lubricated. Because of its homogeneous correlation with the other lubricating film which extends beyond the edge of these chambers, such lubricant will form a very advantageous reserve thereof which also counteracts an interruption of the coherent film of lubricating oil at the points of increased wear.

Further objects, features, and advantages of the present invention will be apparent from the following detailed description thereof, particularly when read with reference to the accompanying drawings in which—

Fig. 2 shows a plan view of the cotact or cotrol surface of the control member of the piston unit shown in Fig. 1;

Fig. 3 shows a fractional cross section through the control member taken along line III—III of Fig. 2;

Fig. 4 shows a fractional cross section through a control member similar to Fig. 3 but slightly modified as compared with that shown in Figs. 2 and 3;

Fig. 5 shows a cross section through the chambers of the control member shown in Fig. 4, taken along line V—V of Fig. 4 but on an enlarged scale;

Figure 10 shows a cross-sectional view corresponding to Figure 4 but showing soft metal or similar material disposed in chamber 27, while Figure 11 shows a view corresponding to a cross-sectional view taken along line XI—XI of Figure 6 but showing soft material disposed in groove 36.

Figure 1:
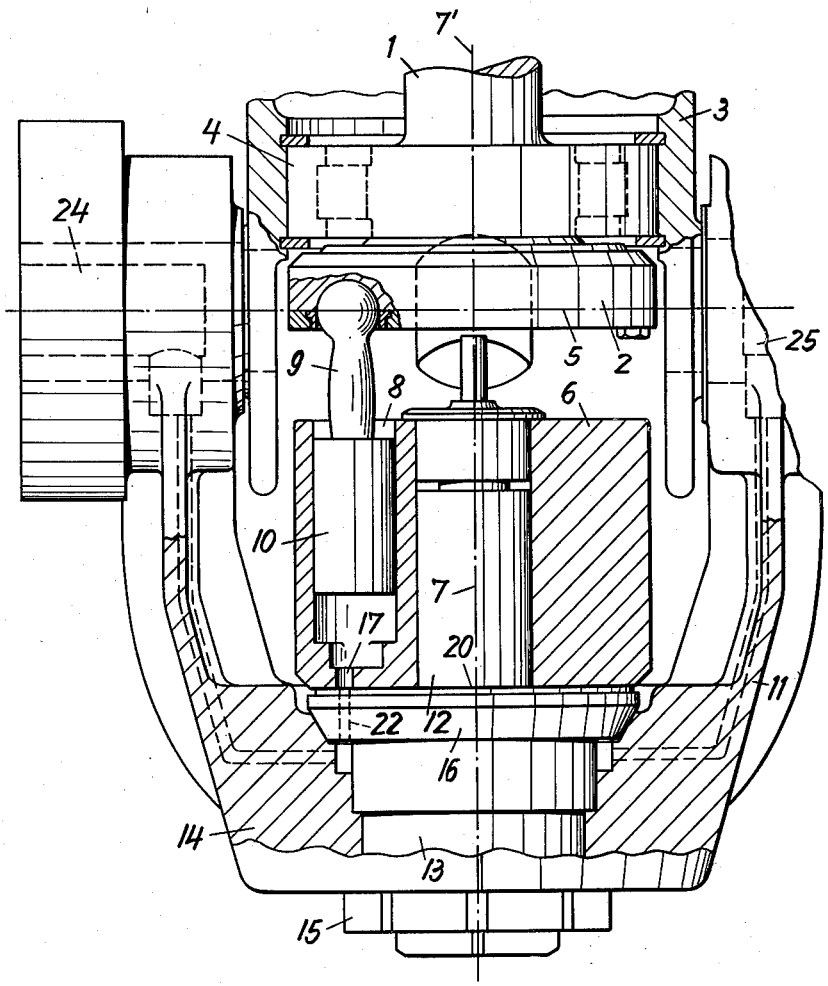
Fig. 1 shows a longitudinal cross section through a hydrostatic transmission with an axial piston unit, such section being taken along the pivotal axis of its pivotal housing.

Referring to the drawings, and first particularly to Fig. 1, the axial piston unit shown therein essentially consists of a main shaft 1 which at one end thereof merges into a driving flange 2 and is rotatably mounted in a stationary housing 3 by means of a roller bearing 4.

Driving flange 2 is connected to a cylinder block 6 which is pivotable about a transverse axis 5 which is disposed within the same plane as flange 2. The longitudinal axis 7 of cylinder block 6 in the central position thereof as illustrated is disposed coaxially with the axis 7' of main shaft 1. Concentrically to its longitudinal axis 7, cylinder block 6 is provided with cylindrical apertures 8 which open toward the driving flange 2. A piston 10 is mounted in each of cylinders 8, and the piston rod 9 thereof is pivotally connected to driving flange 2. For a clearer illustration of the invention Fig. 1 shows only one of the several cylinders 8 and only one piston rod 9.

Cylinder block 6 is surrounded by a further housing 11 which is mounted on the stationary housing 3 about the aforementioned transverse axis 5, preferably so as to be pivotable toward both sides of the direction of the axis of main shaft 1. A shaft 12 which also serves to support cylinder block 6 is disposed within housing 11 so that when housing 11 is not pivoted, the longitudinal axis 7 of cylinder block 6 extends coaxially to axis 7' of main shaft 1. Shaft 12 is not mounted directly on housing 11 but on an insert 13 which, in turn, extends through the end wall 14 of housing 11 toward the outside and is secured thereto by means of a nut 15. This insert 13 carries on its front side facing cylinder block 6 a control-surface member 16 which may, for example, be bolted thereto.

Control-surface member 16, which is stationary in housing 11 while cylinder block 6 rotates during the operation of the axial piston unit, cooperates with oil apertures 17 of cylinder block 6, one of each of which leads to a cylinder 8. Oil apertures 17 are controlled by two control grooves 18 and 19 in the control surface 20, as shown particularly in Fig. 2, which form depressions or recesses therein which may be produced, for example, by milling. These control grooves 18 and 19 are symmetrically disposed on the control surface 20 of control member 16 along a common circle opposite to a central longitudinal plane 21 of control member 16, and each of them forms an annular segment of such circle. During the operation of the axial piston unit, each of the oil apertures 17 is connected intermittently with one point of connection 24 or 25 of the axial piston unit through control grooves 18 and 19 and successive apertures 22 and 23, respectively, and thus, in a manner not particularly shown in the drawing, for example, with the oil circulation system of a hydrostatic transmission containing the axial piston unit. Upon rotation of shaft 1 and inclination of flange 2 about the axis 5, the oil may take a course from connection 24, which may be considered as an inlet port, through the conduit leading to aperture 22 to control groove 18 and aperture 17 leading to cylinder 8, the action of piston 10 drawing the oil into the cylinder. As rotation proceeds and the cylinder is rotated into registry with control groove 19, the oil is forced into this groove through aperture 23 and into the conduit leading to connection 25 which may be considered as an outlet port. The oil pumped from outlet port 25 may be employed, for example, to actuate a hydraulic motor unit.

As shown particularly in Fig. 2, chambers 44 which are separated from each other by thin sealing portions 45 are disposed along the annular segments of the circle as previously mentioned in a direction transverse to the sliding direction and thus adjacent to each other in a radial direction of the control-surface member 16. As shown particularly in Fig. 3, each chamber as seen in a longitudinal section thus forms a flat segment of a circle which may be produced in a simple manner by means of an end-milling cutter of about .06" and smaller widths.

When visualizing the rotary sliding movement of the aforementioned front surface of cylinder block 6 along the control surface 20 of the member 16, it will be immediately seen that during the rotation, oil will be picked up and taken along in the direction of rotation of the cylinder block from the ends of the control grooves 18 and 19 and be conveyed in an ample amount to the portions or segments of a circle between the two control grooves 18 and 19 so that these portions of the surface of the control-surface member will be exposed to considerably less wear than, for example, the parts of the control surface which are disposed outside of the aforementioned circle. Chambers 44 will thus be located at the points of minimum wear, so that the oil which has been taken along in the direction of rotation will then be conveyed to the individual chambers 44 through the thin sealing portions 45 between the chambers, and these chambers will thus serve as oil chambers and produce an effective supplementary lubrication of the other parts of the surface of the control-surface member 16.

Figs. 4 and 5 illustrate a modification of the control-surface member 26 with oil chambers 27 which, as seen in a longitudinal section, have a troughlike shape with inclined end walls 28. These oil chambers 27 may be worked out of the body of the element containing the control surface, for example, by slotting tools. The individual chambers 27, as shown in Fig. 5, have side walls 30 which, as seen in a cross section, are inclined to each other at an angle 29 of approximately 45°, and together with the side walls of the adjacent chambers produce a shape similar to gear teeth. Even under very unfavorable conditions of operation, oil chambers of such shape permit a very intimate cohesion of the film of lubricating oil which is additionally supplied with oil from the chambers.

The present invention is not limited to the particular embodiments described and illustrated, but may be applied generally to the sliding surface of any two machine parts which are sliding along each other under pressure if because of the particular shape or for any other reason there should be an uneven wear. A further improvement may be obtained by filling out the lubricant chambers with a soft, self-lubricating metal, for example, tin, lead, or an oil-containing sinter material of a low degree of hardness and solidity. This expedient is illustrated in Figure 10 which shows chamber 27 filled out with such metal or material 50. While maintaining the improved lubrication according to the invention, a very favorable sealing effect relative to the control grooves of the control surface will thus be obtained.

Figure 8:
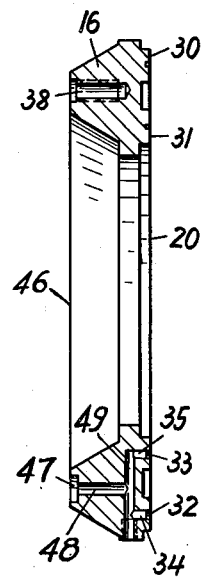
Fig. 8 shows a cross section taken along line VIII—VIII of Fig. 7.
Figure 7:
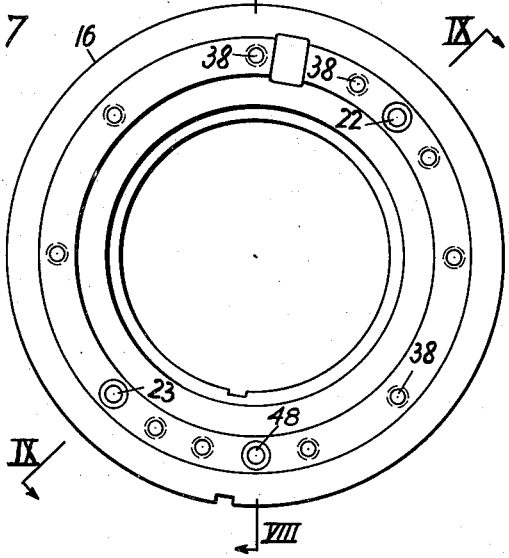
Fig. 7 shows a front view of the same control member but taken upon the opposite front sides thereof.
Figure 9:
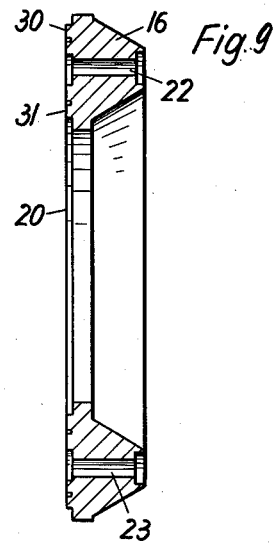
Fig. 9 shows a cross section through the control member taken along line IX—IX of Fig. 7.

In the embodiment of the invention shown in Figs. 6 to 9, and as shown particularly in Fig. 8, an aperture 48 coming from a point of connection 47 at the rear side 46 of the control-surface member 16 and extending concentrically to the axis of such member, terminates into a further aperture 49 which leads in a radial direction from the outside into the control-surface member 16 and may be closed at its outer end. Also, as shown in Fig. 8, within and outside of the circle containing the control grooves 18 and 19 and on the respective adjacent annular sealing surface 30 or 31, the control surface 20 is provided with a relatively small annular groove 32 opposite each of control grooves 18 and 19. An oil supply aperture 34 or 35 which extends parallel to the axis of the control-surface member 16 leads from annular grooves 32 and 33 to the respective radial aperture 49.

Figure 6:
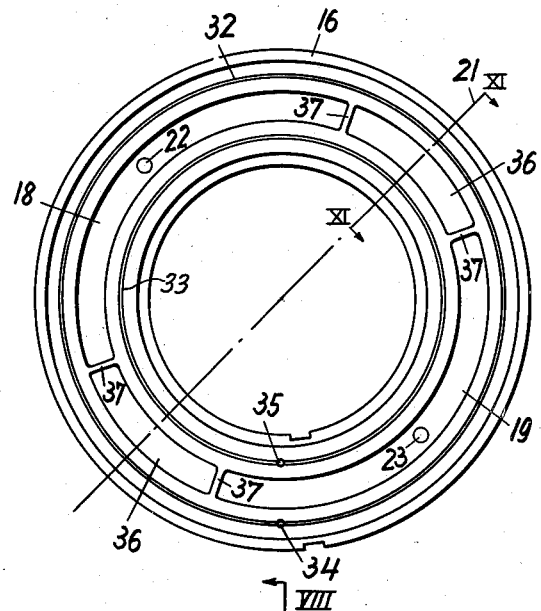
Fig. 6 shows a plan view of a further modification of the control member and illustrates the surface of the control member which cooperates with the contact surface of the cylindrical body thereof.

As may furthermore be seen in Fig. 6, shallow additional grooves 36 are provided between control grooves 18 and 19 and within the circle containing the same. These grooves 36 are preferably filled out with a layer of relatively soft material, for example, soldering tin 51, as illustrated in Figure 11. These glide portions are divided by webs 37 relative to the control grooves 18 and 19 which are adjacent thereto in a pheripheral direction of the circle, and these webs 37 consist of the same material as the control-surface member 16, for example, bronze. The periphery of the rear side 46 of the control-surface member 16 is also provided with a number of tapholes 38 for securing member 16 to the front side of the insert 13 facing the cylinder block 6.

The above description clearly shows that when a rotation of control-surface member 16 occurs relative to cylinder 6, the soft glide portions 51 between the control grooves 18 and 19 will be effectively prevented by the webs 37 from loosening or becoming worn by erosion in the direction toward the adjoining control grooves.

For further elucidating the last-described embodiment of the invention it may be stated that the connecting point 47 at the rear side of the control-surface member 16, as shown in Fig. 8, may be combined in any suitable manner which does not constitute a part of the invention so as to alternate with the control grooves 18 and 19, respectively, of the member 16 which are subjected to action of the pressure oil, so that even the supplementary annular grooves 32 and 33 will be intermittently supplied with pressure oil during the normal operation of the respective axial piston unit. The supply of the additional lubricating oil results in a slight lifting of the control surface 20, whereby a suitable self-lubrication by oil under high pressure from the control grooves 32 and 33 will be obtained even from the moment of starting.

The present invention is not limited to the particular embodiments as described. Thus, for example, if the control grooves in a control surface are surrounded entirely by the layer of softer gliding material, these grooves may be very advantageously completely enclosed by webs or ribs of harder material, preferably of the basic material of the control-surface member, while the mentioned gliding surface adjoins such gliding surface outside of such webs.

When using sinter bronze, the advantage will also be obtained that through the enclosure by the webs, very soft mixtures with excellent gliding qualities may be used.

Although my invention has been illustrated and described with reference to the preferred embodiment thereof, I wish to have it understood that it is in no way limited to the details of such embodiments or to the specific examples described, but is capable of numerous modifications within the scope of the appended claims.

Having thus fully disclosed my invention, what I claim is:

1. A thrust bearing for a drive mechanism comprising a first member having a flat contact surface, a second member having a flat contact surface, said members being adapted for rotation relative to each other with said contact surfaces sliding along each other, central grooves in one of said contact surfaces containing a supply of oil in contact with the other of said contact surfaces, said one of said contact surfaces having surface portions free of control grooves and disposed intermediate said control grooves in the direction of said rotation, said intermediate surface portions having recesses therein forming chambers, and a substantially solid material adapted to reduce the friction between said surfaces filling out said chambers, the said other of said contact surfaces transporting oil from said control grooves in rotative directions toward said solid material upon the occurrence of said rotation.

2. A thrust bearing for a drive mechanism comprising a first member having a gliding surface, a second member having a gliding surface, said members being adapted for relative rotation with said gliding surfaces in mutual contact, control grooves in said first member, web portions carried by said first member disposed on the edges of said grooves, portions of material softer than the material composing said first member disposed on said first member in contact with said web portions, said gliding surface on said first member comprising said portions of said softer material and portions of said web portions.

3. A thrust bearing for a drive mechanism as defined in claim 2, wherein said portions of said softer material consist of a sinter material containing oil.

4. A thrust bearing for a drive mechanism comprising a first member having a flat surface, a second member having a flat surface, said members being adapted for rotation relative to each other with said flat surfaces in mutual contact, portions of said flat surface on said first member being provided with arcuate control grooves, means for reducing friction between said surfaces comprising sinter material disposed on said portions radially adjacent said arcuate control grooves and forming at least a part of the flat surface of said first member.

5. A thrust bearing according to claim 4, wherein said sinter material is sintered on said first member, said sinter material containing at least one additive of material from the group including lead, graphite, sulphides and phosphates for the purpose of improving the sliding qualities of said sinter material.

6. A thrust bearing according to claim 4, wherein said first member is provided with recesses therein intermediate the ends of said arcuate control grooves, said sinter material being disposed in said recesses and constituting other parts of said flat surface of said first member.

7. A thrust bearing according to claim 6, wherein said arcuate control grooves contain a supply of oil, said flat surface of said second member being in contact with said oil and transferring said oil to said sinter material disposed in said recesses upon the occurrence of said rotation.

8. A thrust bearing according to claim 6, wherein said recesses are arranged in series and extend transverse to the direction of said rotation, said recesses being in the form of grooves and being separated by thin wall portions, said first member being constituted of a harder material than said sinter material.

9. A thrust bearing for a drive mechanism comprising a first member having a flat surface, a second member having a flat surface, said members being adapted for rotation relative to each other with said flat surfaces in mutual contact, means for reducing friction between said flat surfaces comprising arcuate control grooves in the said flat surface of said first member, said control grooves containing a supply of oil in contact with the flat surface of said second member, said means further comprising sinter material forming part of said first-named flat surface, portions of said sinter material being located on the portions of the flat surface of said first member in the vicinity of said control grooves, the said flat surface of said second member transferring oil from said control groove to parts of the flat surface of said first member upon the occurrence of said rotation.

10. In a hydrostatic transmission comprising a rotatable cylinder block provided with oil apertures and supported for rotation on a control member having control grooves cooperating with said oil apertures; bearing means on said cylinder block and said control member comprising a flat portion on said cylinder block, a flat portion on said control member in engagement with said flat portion of said cylinder block, said flat portion of said control member intermediate said control grooves comprising sinter material, said control grooves containing a supply of oil in contact with said flat portion of said cylinder block, said last-named flat portion transferring oil in the direction of said sinter material upon the occurrence of said rotation.

11. A thrust bearing for a drive mechanism according to claim 2 wherein said softer material comprises a soft, self-lubricating metal.

12. A thrust bearing for a drive mechanism according to claim 11 wherein said soft, self-lubricating metal is tin.

13. A thrust bearing for a drive mechanism according to claim 11 wherein said soft, self-lubricating metal is lead.

14. A thrust bearing for a drive mechanism according to claim 4, wherein said arcuate control grooves contain a supply of lubricant, said flat surface of said second member being in contact with said lubricant and transferring said lubricant to said sinter material upon the occurrence of said rotation.

15. A thrust bearing for a drive mechanism comprising a first member having a flat surface, a second member having a flat surface, said members being adapted for rotation relative to each other with said flat surfaces in mutual contact, portions of said flat surface of said first member being provided with arcuate control grooves adapted to contain a supply of oil, said first member being provided with recesses therein intermediate the ends of said control grooves, bearing material softer than the material comprising said first member being disposed in said recesses, said flat surface of said second member being in contact with said oil and transferring same to said bearing material upon the occurrence of said rotation, means in said first member adapted to conduct oil, said means including apertures extending through said first member and having openings into said arcuate control grooves.

16. A thrust bearing according to claim 15, wherein said means in said first member adapted to conduct oil further comprises at least one annular groove in the said flat surface of said first member and comprises further aperture means including at least one further aperture extending through said first member, said further aperture means being in communication with said one annular groove, and said bearing material being disposed adjacent said annular groove.

17. A thrust bearing according to claim 15, wherein said means in said first member adapted to conduct oil further comprises two annular grooves in said flat surface of said first member and comprises further aperture means including further apertures extending through said first member, said further aperture means being in communication with said two annular grooves, said two annular grooves being disposed adjacent to and respectively radially inwardly and outwardly of said bearing material.

References Cited in the file of this patent

UNITED STATES PATENTS

| | | |
|---|---|---|
| 1,496,809 | Johnson | June 10, 1924 |
| 1,856,304 | Whiteley | May 3, 1932 |
| 1,867,308 | Durner | July 12, 1932 |
| 1,923,514 | Stockfleth | Aug. 22, 1933 |
| 2,153,397 | Sandler | Apr. 4, 1939 |
| 2,268,869 | Given | Jan. 6, 1942 |
| 2,272,771 | Hawley | Feb. 10, 1942 |
| 2,297,518 | Wegerdt | Sept. 29, 1942 |
| 2,350,854 | Whiteley | June 6, 1944 |
| 2,404,808 | Lowey | July 30, 1946 |

FOREIGN PATENTS

| | | |
|---|---|---|
| 691,199 | France | July 7, 1930 |